US007925993B2

(12) United States Patent
Williams

(10) Patent No.: US 7,925,993 B2
(45) Date of Patent: Apr. 12, 2011

(54) METHOD AND SYSTEM FOR AGGREGATING AND PRESENTING USER HIGHLIGHTING OF CONTENT

(75) Inventor: Brian R. Williams, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 616 days.

(21) Appl. No.: 11/394,361

(22) Filed: Mar. 30, 2006

(65) Prior Publication Data
US 2007/0234209 A1    Oct. 4, 2007

(51) Int. Cl.
   G06F 9/00          (2006.01)
   G06F 3/048        (2006.01)
   G06F 17/21        (2006.01)
   G06F 17/24        (2006.01)
   G06F 17/00        (2006.01)

(52) U.S. Cl. ........ 715/821; 715/767; 715/230; 715/232; 715/233

(58) Field of Classification Search .................. 715/767, 715/821, 230, 232, 233
See application file for complete search history.

(56) References Cited

U.S. PATENT DOCUMENTS

| | | | |
|---|---|---|---|
| 5,581,670 A | 12/1996 | Bier | |
| 5,617,114 A | 4/1997 | Bier | |
| 5,729,704 A | 3/1998 | Stone | |
| 5,946,678 A * | 8/1999 | Aalbersberg | 715/204 |
| 5,970,455 A * | 10/1999 | Wilcox et al. | 704/270 |
| 6,154,752 A | 11/2000 | Ryan | |
| 6,279,014 B1 * | 8/2001 | Schilit et al. | 715/234 |
| 6,285,999 B1 | 9/2001 | Page | |
| 6,446,095 B1 | 9/2002 | Mukai | |
| 6,529,023 B2 | 3/2003 | Becker | |
| 6,557,015 B1 | 4/2003 | Bates | |
| 6,799,176 B1 | 9/2004 | Page | |
| 6,816,851 B1 | 11/2004 | Olsson | |
| 6,839,702 B1 | 1/2005 | Patel | |
| 6,859,909 B1 * | 2/2005 | Lerner et al. | 715/203 |
| 6,900,819 B2 * | 5/2005 | Marshall et al. | 345/667 |
| 7,069,518 B2 * | 6/2006 | Card et al. | 715/776 |
| 7,113,935 B2 | 9/2006 | Saxena | |

(Continued)

OTHER PUBLICATIONS

Robert, C., "Collaborative Annotation Creation and Access in a Multimodal Environment with Heterogeneous Devices for Decision Support and for Experience Sharing", 2008, IEEE International Conference on Sensor Networks. p. 523-523.*

(Continued)

*Primary Examiner* — William L Bashore
*Assistant Examiner* — Jordany Núñez
(74) *Attorney, Agent, or Firm* — Christensen O'Connor Johnson Kindness PLLC

(57) ABSTRACT

Highlighting of content is aggregated across a plurality of users, thus enabling the content to be presented with highlights that represent the collective highlighting of the users. Highlighted content may be presented to the users with varying levels of prominence. Accordingly, depending on the aggregated highlight information, some content may be presented with a highlight that is more or less prominent than highlighting for other content. Prominence data associated with highlighted content may include a score indicative of a strength of the highlight for the highlighted content. A score indicating a stronger highlight causes the highlight to be presented with greater prominence. The score may be incremented, possibly on a weighted bases, to represent the combined highlighting of different users. Highlights may assume many different forms, including visual forms (such as colors, lines, borders, fonts, icons, etc.), audio forms and tactile forms.

84 Claims, 6 Drawing Sheets

U.S. PATENT DOCUMENTS

| | | | |
|---|---|---|---|
| 7,330,787 B2 * | 2/2008 | Agrawala et al. | 701/208 |
| 2002/0010757 A1 | 1/2002 | Granik | |
| 2002/0075302 A1 | 6/2002 | Simchik | |
| 2002/0196273 A1 | 12/2002 | Krause | |
| 2002/0198979 A1 | 12/2002 | Yu | |
| 2003/0050927 A1 * | 3/2003 | Hussam | 707/5 |
| 2003/0075099 A1 * | 4/2003 | Dowdle et al. | 116/235 |
| 2004/0001087 A1 | 1/2004 | Warmus | |
| 2004/0059997 A1 | 3/2004 | Allen | |
| 2004/0194021 A1 * | 9/2004 | Marshall et al. | 715/512 |
| 2004/0205575 A1 | 10/2004 | Wattenberg | |

OTHER PUBLICATIONS

"About the Alexa Traffic Rankings," Alexa, <http://web.archive.org/web/20031002005825/http://pages.alexa.com/prod_serv/traffic_learn_more.html> [retrieved Nov. 28, 2007], 3 pages.

"Unique Click," Email Marketing Glossary, Forty Two Int'l, <http://web.archive.org/web/20040822045541/http://www.campaignmaster.com.au/glossary/email_marketing_unique_click_htm> [retrieved Nov. 28, 2007], 2 pages.

"Audioscrobbler Browser," <http://www.pmbrowser.info/audioscrobbler.html> [retrieved Jul. 11, 2005], 1 page.

"BookManager Library Reader for Windows: Online Reference," <http://publib.boulder.ibm.com/cgi-bin/bookmgr/BOOKS/ejrl3m00/FIRST?DT=19940811000506&SHE...> [retrieved Mar. 15, 2005], 1 page.

Edwards, M., and S. Roberts, "Reusing Internet Explorer and the WebBrowser Control: An Array of Options," MSDN.com, Jul. 30, 1998, <http://msdn2.microsft.com/en-us/library/bb250464(printer).aspx> [retrieved Feb. 20, 2008], pp. 1-8.

"Everything Burns," <http://jimfl.tensegrity.net/zeitgeist/> [retrieved Jul. 11, 2005], 1 page.

"Glossary Glossary of Terms and Abbreviations," BookManager Library Reader for Windows: Online Reference, <http://publib.boulder.ibm.com/cgi-bin/bookmgr/BOOKS/ejrl3m00/GLOSSARY?DN=SC34-3066-00&...> [retrieved Mar. 15, 2005], 1 page.

Jeanson, R., et al., "Pheromone Trail Decay Rates on Different Substrates in the Pharaoh's Ant, *Monomorium pharaonis*," Physiological Entomology 28:192-198, 2003.

"Metadata Visualization," <http://ichris.ws/node/795> [retrieved Jul. 11, 2005], pp. 1-2.

"MovableTypeZeitgeistPlugin," <http://twiki.tensegrity.net/bin/view/Main/MovableTypeZeitgeistPlugin> [retrieved Jul. 11, 2005], pp. 1-2.

"netLibrary eBook Reader: eBook Software," ©2005 BinaryThing Pty. Ltd., <http://www.planetebook.com/mainpage.asp?webpageid=15&TBToolID=1069> [retrieved Jun. 14, 2006], pp. 1-2.

"Planet Ebook," <http://www.planetebook.com/mainpage.asp?webpageid=15&TBToolID=1069> [retrieved Mar. 7, 2007], pp. 1-2.

"Section S," of BookManager Library Reader for Windows: Online Reference, <http://publib.boulder.ibm.com/cgi-bin/bookmgr/BOOKS/ejrl3m00/GLOSSARY?FS=TRUE&SHELF=...> [retrieved Mar. 15, 2005], pp. 1-5.

"Tags," <http://www.flickr.com/photos/tags/> [retrieved Jul. 11, 2005], pp. 1-2.

"TouchGraph LLC," <http://www.touchgraph.com/> [retrieved Jul. 11, 2005], 3 pages.

"43 Things," <http://www.43things.com/> [retrieved Jul. 11, 2005], pp. 1-2.

"netLibrary eBook Reader: eBook Software," © 2005 BinaryThing Pty. Ltd., <http://www.planetebook.com/mainpage.asp?webpageid=15&TBToolID=1069> [retrieved Jun. 14, 2006].

"Audioscrobbler Browser," <http://www.pmbrowser.info/audioscrobbler.html> [Retrieved Jul. 11, 2005].

BookManager Library Reader for Windows: Online Reference, <http://publib.boulder.ibm.com/cgi-bin/bookmgr/BOOKS/ejrl3m00/First?DT=19940811000506&SHE..> [Retrieved Mar. 15, 2005].

"Everything Burns," <http://jimfl.tensegrity.net/zeitgeist/> [Retrieved Jul. 11, 2005].

"Glossary Glossary of Terms and Abbreviations,"BookManager Library Reader for Windows: Online Reference, <http://publib.boulder.ibm.com/cgi-bin/bookmgr/BOOKS/ejrl3m00/GLOSSARY?DN=SC34-3066-00&...> [Retrieved Mar. 15, 2005].

Jeanson, Raphaël, et al., "Pheromone Trail Decay Rates on Different Substrates in the Pharaoh's Ant, *Monomorium pharaonis*," Physiological Entomology 28:192-198, 2003.

"Metadata Visualization," <http://ichris.ws/node/795> [Retrieved Jul. 11, 2005].

"MovableTypeZeitgeistPlugin," <http://twiki.tensegrity.net/bin/view/Main/MovableTypeZeitgeistPlugin> [Retrieved Jul. 11, 2005].

"Section S," of BookManager Library Reader for Windows: Online Reference, <http://publib.boulder.ibm.com/cgi-bin/bookmgr/BOOKS/ejrl3m00/GLOSSARY?FS=TRUE&SHELF=...> [Retrieved Mar. 15, 2005].

"Tags," <http://www.flickr.com/photos/tags/> [Retrieved Jul. 11, 2005].

"TouchGraph LLC," <http://www.touchgraph.com/> [Retrieved Jul. 11, 2005].

"43 Things," <http://www.43things.com/> [Retrieved Jul. 11, 2005].

"Planet Ebook," <http://www.planetebook.com/mainpage.asp?webpageid=15&TBToolID=1069> [Retrieved Mar. 7, 2007].

"'Death Squads' Hunted," CNN.com, published as early as Mar. 31, 2003, <http://web.archive.org/web/20030331131808/pttp://www.cnn.com...> [retrieved Aug. 25, 2008], 2 pages.

* cited by examiner

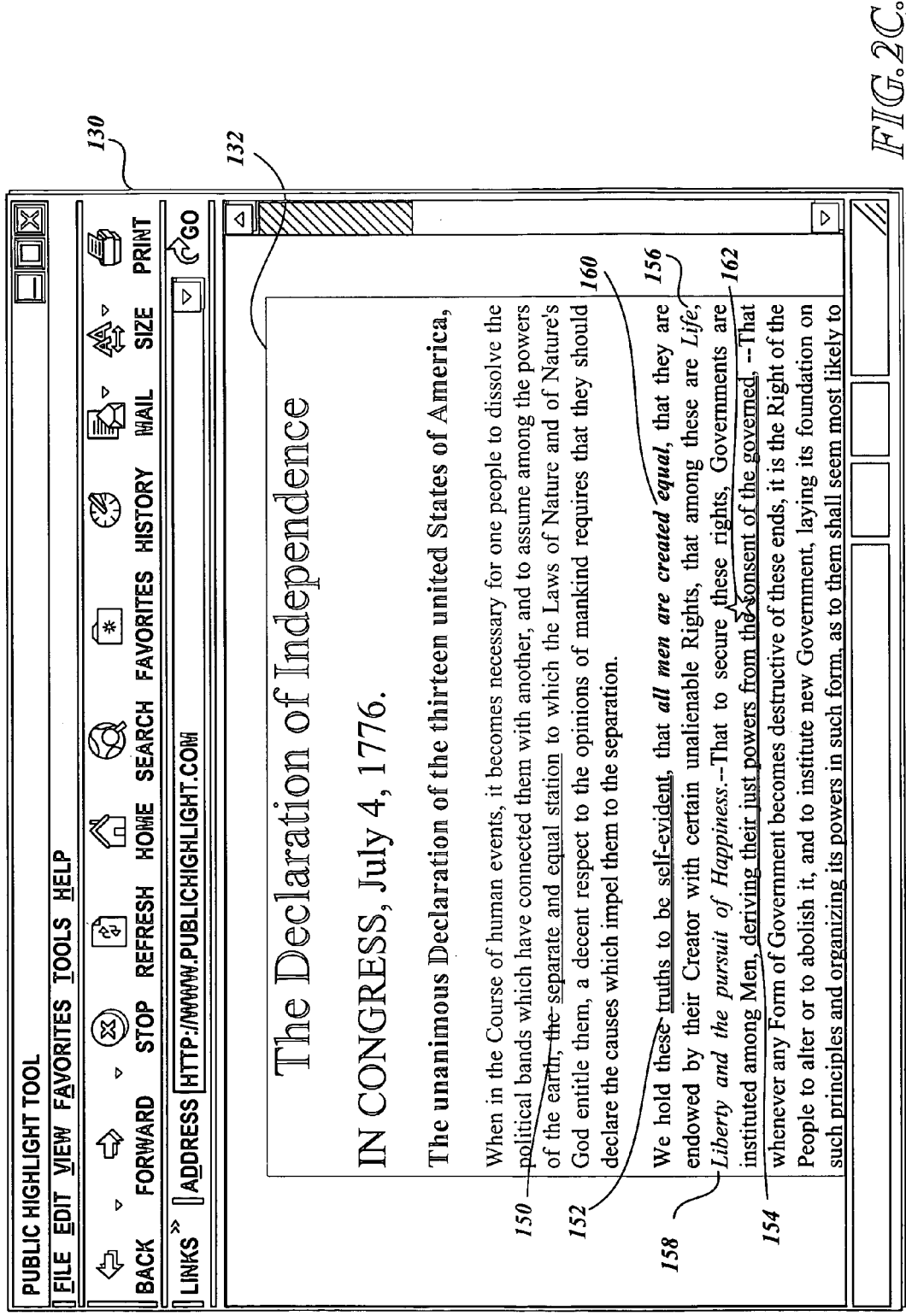

METHOD AND SYSTEM FOR AGGREGATING AND PRESENTING USER HIGHLIGHTING OF CONTENT

BACKGROUND

The present disclosure relates to the presentation of content by computer systems and other devices, and particularly to the presentation of content that has been highlighted by a plurality of users.

Users may employ computer systems to obtain and exchange information with other users in either real-time or through storage and retrieval from computer memories. Information may be embodied in many forms, including, but not limited to, Web pages, documents, files, etc., that are generated dynamically or stored on local or remote computing systems. Computer networks are well known for providing communication between different users.

Where a computer network is involved, a computer system can access content using a network address that identifies the desired content in the computer network. Content is often identified and accessed in reference to a Uniform Resource Identifier ("URI"), an example of which is a Uniform Resource Locator ("URL"). Upon entering a URL into a Web browser, the Web browser may contact a computing system indicated by the URL and obtain the identified content. Computer networks in this regard range from local area networks to wide area networks to global networks including the Internet. The Internet, in particular, enables a large number of users to access a large amount of content on different computing systems.

Users presented with content via a network or otherwise may desire to mark the content to indicate portions that the users consider to be more important, more relevant, more interesting, etc. Some software applications, such as word processing software, allow a user to select text and associate a colored "highlight" with the text. Other software applications, such as Web browsers (either natively or through a toolbar add-on) allow a user to select text in Web page and associate a colored highlight with the text. In such cases, the user may store and retrieve the highlight information at a later time when the content is again accessed. In such instances, however, the user is limited to viewing the content with only the user's own highlight information.

A need exists for technology in which a plurality of users can be presented with content that is highlighted not only according to highlight information generated by the user, but also according to highlight information generated by other users. An ability to aggregate highlight information received from a plurality of users and present the content to the users with highlights having varying levels of prominence according to the aggregated highlight information will have significant benefits, particularly if minimal or no effort on the part of the users is required (other than to input the user's own highlights). Embodiments of the present invention address these needs and other shortcomings that exist in the current state of the art.

SUMMARY

The following summary is provided to introduce a selection of concepts in a simplified form that are further described below in the Detailed Description. It should be understood that this summary is not intended to identify key features of the claimed subject matter, nor is it intended to be used as an aid in determining the scope of the claimed subject matter.

In one aspect, the present application describes embodiments of methods, systems, and services in which a plurality of users can highlight portions of content and the highlighted content is aggregated across the plurality of users, thus enabling the content to be presented to the users with highlights that represent a collective highlighting effort of the users. The highlights may be presented to the users with varying levels of prominence. Accordingly, depending on the aggregated highlight information, some content may be presented with a highlight that is more or less prominent than highlighting for other content.

A method for highlighting content according to one embodiment may include receiving highlight information from a user in which the user has identified content to be highlighted. Thereafter, the highlight information received from the user is aggregated with highlight information received from other users for the same content. Prominence data is associated with the highlight information and is used to affect a prominence at which the highlighted content is displayed to the user. The prominence data may be modified based on a combination of the highlight information of the user and the highlight information of the other users.

In one aspect, highlight information received from users may include horizontal and vertical position information that identifies a location of the content to be highlighted. The highlight information may also include size information, such as width and height information, that identifies a size of the highlighted content.

In another aspect, the prominence data may include a score that indicates a strength of the highlight for the highlighted content. In that regard, a score indicating a stronger highlight causes the highlight to be presented with greater prominence when the highlighted content is presented. If suitable, the score may be determined from a mathematical calculation that combines the highlight information of the user and the other users. In some embodiments, the highlight information received from a user may include a user-indicated level of importance of the highlighted content, which level of importance is taken into account when the prominence data for the highlighted content is modified.

Highlights may assume many different forms, including but not limited to visual forms (e.g., colors, lines, borders, fonts, icons, etc.), audio forms, tactile forms, etc., and any combinations thereof. The prominence at which highlights are presented may be adjusted by modifying attributes such as the color or intensity of the highlight, by modifying a width or format of a line or border, by changing fonts, by using different icons, by modifying aural attributes of an audio highlight, etc. Additional discussion of highlights and prominence data is provided herein.

Also disclosed herein are embodiments in which highlight information received from a user is weighted to have a greater or lesser effect on the prominence of highlights vis-á-vis the highlight information received from other users. In one aspect, the highlight information of a user may be weighted to have a greater or lesser effect based on a recognized reputation of the user. For example, the highlight information may be weighted to have a greater effect when aggregating the highlight information if the user is a recognized authority, such as an author of the content to be highlighted. Alternatively, or in addition, the reputation of a user may be derived from feedback received from other users.

To manage the aggregated highlight information, including scores that are used to determine the prominence of highlights, the aggregated highlight information, such as the scores, may be configured to decay over time. In another implementation, scores may be configured to decay based on user activity with the content without further highlighting of the content.

Further embodiments may be implemented where the user and other users belong to a group and the highlight information of the user is aggregated only with highlight information of the other users who belong to the group.

In another embodiment, a computer-implemented service may be provided, wherein the service is operable to aggregate highlight information received from a plurality of users who have identified content to be highlighted. The service may be further operable to modify prominence data associated with the highlighted content based on the aggregated highlight information. The prominence at which the highlight is displayed when the highlighted content is presented may be adjusted.

Also disclosed herein is a system for presenting highlighted content. In one embodiment, a system comprises a computing component configured to receive highlight information from a user in which the user has identified content to be highlighted with a highlight; a processing component configured to aggregate the highlight information of the user with highlight information received from other users for the same content; and a storage component configured to store the aggregated highlight information. The storage component is further configured to store prominence data in association with the highlight information, the prominence data being configured to affect a prominence of the highlight when the highlighted content is presented. Moreover, the processing component is further configured to modify the prominence data for the highlighted content based on the aggregated highlight information.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2C is a display diagram of a typical Web browser as shown in FIG. 2A, wherein the content is displayed with other forms of highlights at varying levels of prominence;

DETAILED DESCRIPTION

Figure 1:
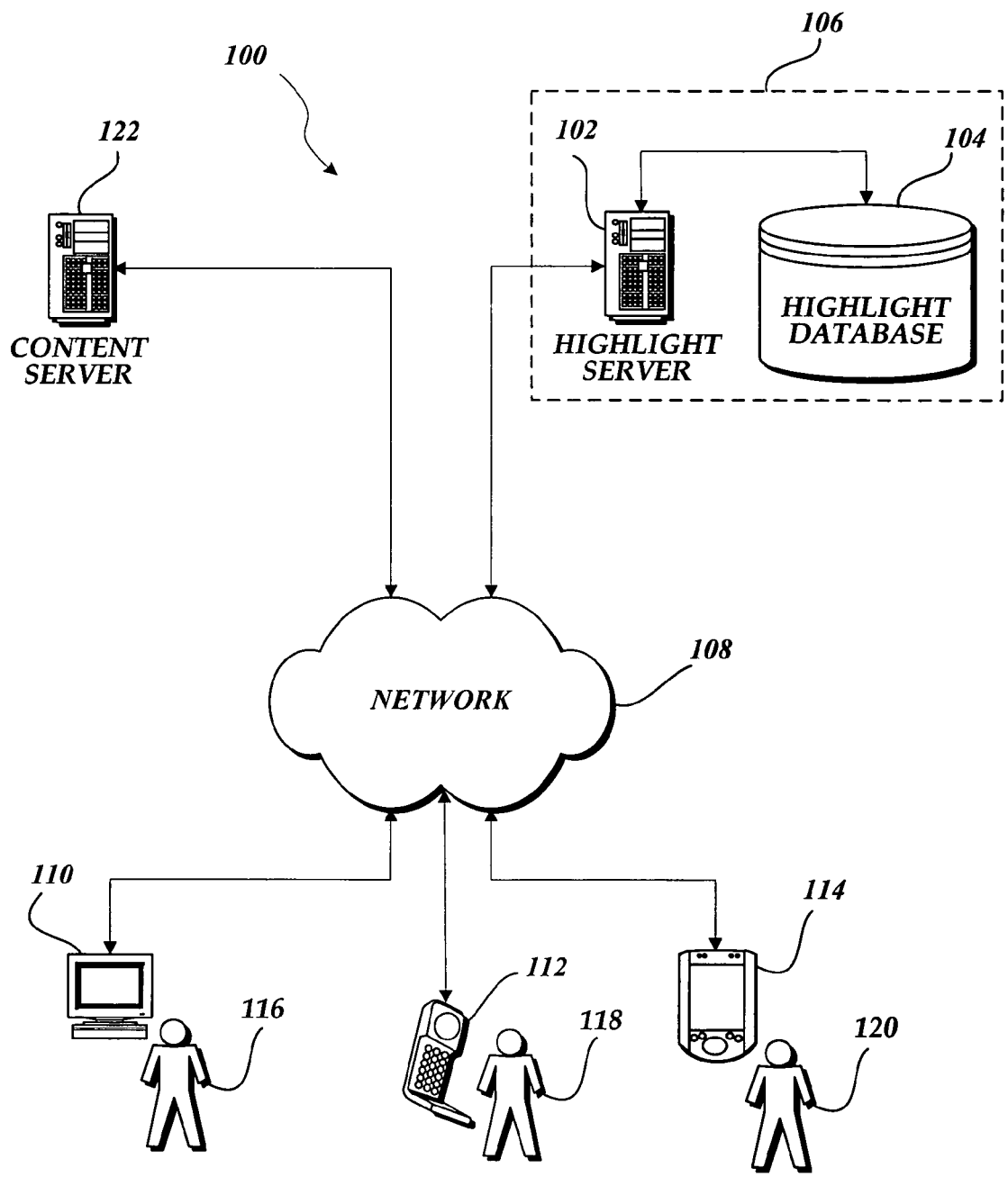
FIG. 1 is a pictorial diagram illustrating one example of a computing environment in which embodiments of the present invention may be implemented.

FIG. 1 provides an exemplary overview of a computing environment 100 in which embodiments described herein may be implemented. The depicted environment 100 includes a highlight server 102 in communication with a highlight database 104. As described below, the highlight server 102 and the highlight database 104 may cooperate to provide a content highlighting service 106 accessible via a network 108.

FIG. 1 also depicts examples of client devices 110, 112, and 114 communicatively connected to the network 108. The client device 110 is shown associated with a user 116, while the client device 112 is shown with a user 118 and the client device 114 is shown with a user 120. The client devices 110, 112, 114 include any type of device or system that provides input and/or output to users, including but not limited to devices such as computers, PDAs, wireless phones, smartphones, electronic readers, laptops, servers, workstations, etc. Further depicted in FIG. 1 is a content server 122 that is communicatively connected via the network 108 to the client devices 110, 112, 114 and to the highlight server 102.

The content server 122 (which may be one of numerous content servers connected to the network 108) is configured to provide content to the client devices 110, 112, 114, or to the highlight server 102, for presentation to the users 116, 118, 120. The content made available by the content server 122 is typically addressable by a resource identifier that identifies the content in the network. Such content may include, but is not limited to, Web pages, files, documents, media streams, etc., that are stored or generated dynamically by the content server 122 or by a computing system that is local or remote to the content server 122.

It should be understood that the term "resource identifier" used in connection with different exemplary embodiments described herein may refer to any identifier that identifies content available on a computing system. For example, the content may be located on a local computing system and thus identified by a local resource identifier (e.g., drive identifier and file identifier). The content may be located on a remote computing system and thus identified by a remote resource identifier (e.g., network domain identifier and file identifier).

The users 116, 118, 120 may operate the client devices 110, 112, 114 to obtain content from the content server 122 via the network 108 using wired and/or wireless connections. The network 108 may be a Local Area Network ("LAN"), a larger network such as a Wide Area Network ("WAN"), or a collection of networks, such as the Internet. Protocols for network communication, such as TCP/IP, are well known to those skilled in the art of computer networks. As further described herein, the users 116, 118, 120 may also operate the client devices 110, 112, 114 to highlight portions of the content presented on the client devices and communicate the highlight information to and from the content highlighting service 106. The highlight server 102 is operable to aggregate highlight information received from the users 116, 118, 120 and to associate prominence data with the highlighted content. The prominence data may be modified by the highlight server 102 based on the aggregated highlight information to affect a prominence of display of a highlight when the highlighted content is presented to users. As will be seen herein, some content may be presented with a highlight that is more prominent than other highlighted content. If desired, the prominence data may be stored in the highlight database 104 with the aggregated highlight information. While FIG. 1 illustrates a client-server environment, other embodiments may operate in a peer-to-peer networked environment. Additionally, embodiments of the invention may be implemented in a non-networked environment. For example, multiple users may highlight content and communicate the highlighted content amongst themselves to enable aggregation of the highlighted content. The aggregation of highlighted content, as discussed herein, could be performed by any one of the client devices having access to the user highlights made by users at the same or other client devices.

As will be appreciated by those skilled in the art and others, FIG. 1 provides a simplified example of just one suitable computing environment 100 for implementing embodiments of the present invention, and does not limit the invention thereto. In some embodiments, one or more of the computing systems shown, e.g., the content server 122, the client devices 110, 112, 114, and/or the highlight server 102, may be implemented in a single computing system and thus not require network protocols for communication between the combined systems.

Also discussed herein are examples in which prominence data (which may include a score and/or other parameters that define a highlight and its prominence when presented to a user) are stored and retrieved from the highlight database 104. It should be understood and appreciated that the highlight database 104, in practice, may represent multiple repositories of information that may reside in multiple computer systems that are possibly remote from each other and unrelated to each other. Moreover, from the standpoint of the repositories, the information in the multiple repositories may not be considered "prominence data," but may be retrieved and used in accordance with principles described to determine scores and/or parameters that affect the presentation of highlights at various levels of prominence. The information may be specially stored in the repositories for this purpose, or may be ordinary data collected for other purposes. Such data may, for example, be retrieved on-the-fly in accordance with principles of the invention when prominence data is required.

When software formed in accordance with the invention is implemented in one or more computer systems, for example of the type illustrated in FIG. 1, the computer systems provide a way for a plurality of users to obtain content, to submit highlight information in which the users have identified content to be highlighted, and to receive previously stored highlight information and/or prominence data reflecting an aggregate of the highlight information submitted by the plurality of users. Presenting highlighted content at varying levels of prominence enhances the user's computing experience because it combines the collective consideration and evaluation of the content by multiple users. This typically enhances the likelihood that content will be presented with prominent highlights indicating portions that the users collectively find to be more important, relevant, valuable, interesting, etc.

Figure 2A:
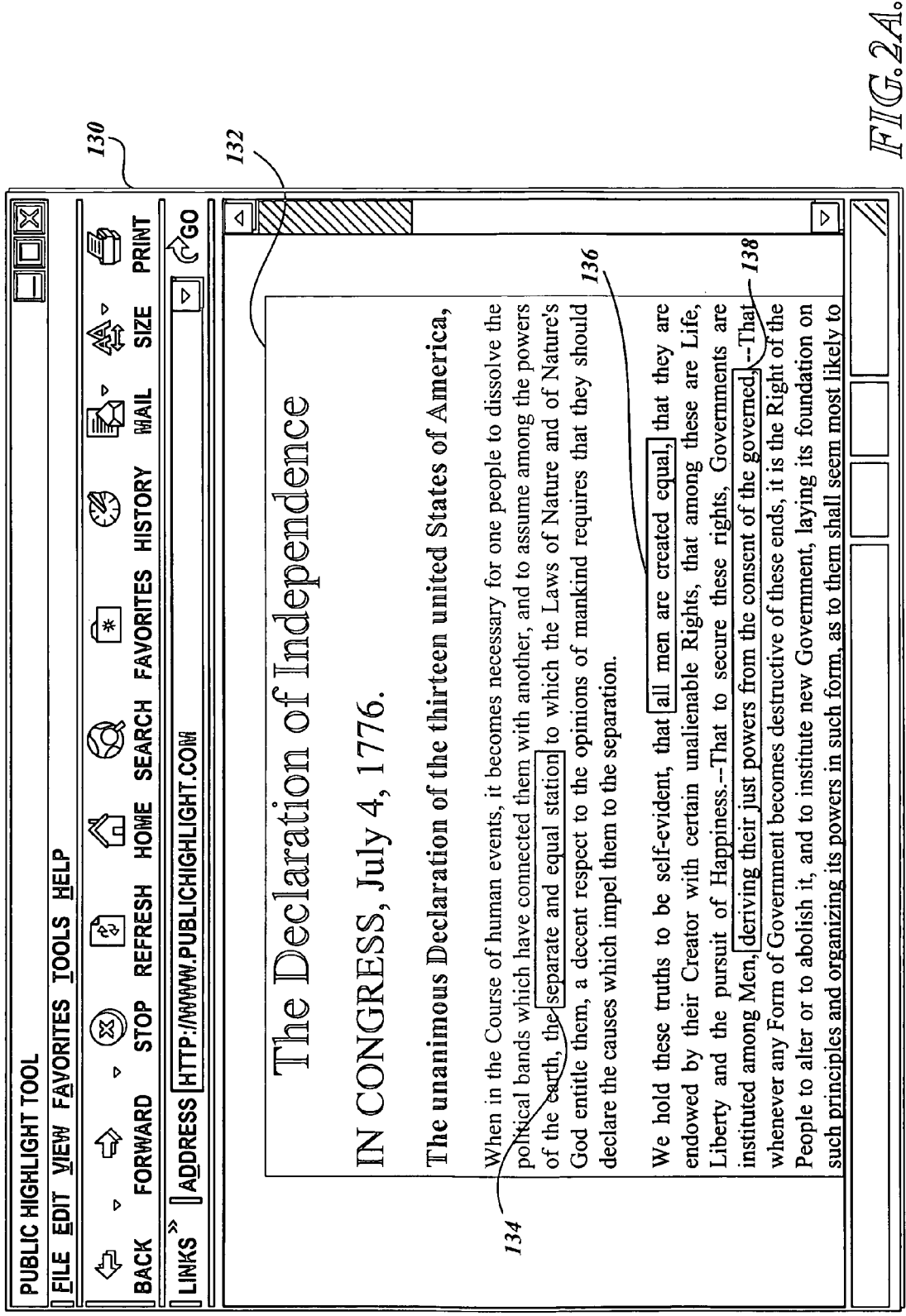
FIG. 2A is a display diagram showing a typical Web browser in which content is displayed and certain portions of the content have been highlighted by a user.

Prior to discussing flow diagrams of exemplary methods for implementing embodiments of the invention, a discussion of exemplary content viewing systems depicting highlighted content is provided. FIG. 2A, for instance, is display diagram showing a typical Web browser in which content is displayed and certain portions of the content have been highlighted by a user.

In FIG. 2A, a Web browser 130 includes a display area in which content 132 is presented. In this example, a user has submitted a resource identifier and retrieved a transcription of the Declaration of Independence. Upon review of the content 132, the user desired to highlight certain portions of the content 132. Using functionality either built natively into the Web browser 130 or added to the Web browser (e.g., though a plug-in software tool), the user identified some or all of the content 132 to be highlighted. Technology that enables a user to select and identify content to be highlighted in a display is known to persons having ordinary skill in the art and need not be discussed in detail herein. For example, a user may position a pointer over the content (e.g., using a mouse, a handheld stylus, or other input device) and drag the pointer over the content to select the content. The user may thereafter activate a control, such as a button or menu command, that initiates a highlighting of the selected content.

In the example shown in FIG. 2A, the user has selected content at reference numerals 134, 136, and 138 to be highlighted. In some embodiments, the highlighting may be shown immediately to the user to acknowledge receipt of the user's highlight information. In FIG. 2A (as well as FIGS. 2B and 2C), highlights applied to the selected content are illustrated by boxes drawn around the highlighted content. In other displays however, highlights may take any number of forms other than a box having a visible border, as will be described later herein. Boxes are used in the drawings simply for ease of illustration and should not be interpreted as limiting the scope of possible highlights that can be used.

When a user identifies content to be highlighted, e.g., by dragging a pointer to select particular text in a page, a computing system may determine locating information for the user-identified content. The locating information is used to place highlighting over or around the identified content. In one embodiment, a page containing textual content may include information that identifies the position and size of the text (and possibly non-text objects) presented on the page. The position and size information of portions of content in the page may be recorded as "quads," which include four numbers representing the X and Y position and the width and height of the text as it appears on the page. In this embodiment, the X and Y position comprises horizontal and vertical position information that identifies a location of the particular content. The width and height information identifies a size of the particular content.

While quads representing coordinate information are frequently generated when an optical character recognition process is applied to a graphical image of text, other locating information may be generated in other circumstances. For example, rather than identifying coordinate information such as X and Y positions, locating information may identify positions relative to a display of the content. As content is presented in different displays and the content is rearranged according to the particular displays, the locating information enables highlights to be applied to the content as it is presented. Similarly, locating information may identify positions relative to certain points or markers in the content. It will be appreciated that any form of locating information that enables corresponding content to be highlighted may be used.

It should be recognized that portions of content for highlighting may be identified at any desired level of granularity. In instances where quad information is generated, quads may be determined for every letter, character, or number in the content, or portion thereof. Alternatively, or in addition, quad information may be determined for groups of letters, characters and/or numbers, e.g., words, phrases, sentences, paragraphs, pages, chapters, sections, etc. When the user has identified content to be highlighted, the locating information for the highlighted content (an example being quad information, in this embodiment) is stored, for example in the highlight database 104 shown in FIG. 1. The locating information that is stored need not include the actual highlighted content provided that the locating information includes sufficient information, such as a resource identifier, that can be used to obtain the content from another source and allow a highlighter to be properly positioned over or around the content to be highlighted.

The locating information and other highlight information may be stored in the database 104 with or without reference to the identity of the user. In embodiments where the identity of the user is maintained, the user may decide at a later time to again view the content with only the highlights personally generated by the user. In accordance with other aspects discussed herein, the highlight information of the user is aggregated with highlight information of other users. The highlight information of users may thus be stored in more than one database, e.g., a database in which the users' identity is maintained with respect to the user's highlights, and a database in which the highlight information of multiple users is aggregated and stored collectively. These databases may be stored together in the highlight database 104 shown in FIG. 1, or in two or more separate databases or storage units (not shown).

By aggregating highlight information from multiple users and presenting the content with highlights according to the aggregated information, users benefit from the collective review and consideration of the content at issue. As indicated earlier, highlights are presented with varying prominence according to the aggregated highlight information. Prominence data may be generated and stored in the highlight database 104 to affect the prominence at which the highlight of highlighted content is presented.

In one exemplary embodiment, prominence data associated with highlighted content may include a score that indicates a strength of the highlight for the highlighted content. A score indicating greater strength, for example, may cause the highlight to be presented with greater prominence when the highlighted content is presented. Conversely, a score indicating lesser strength may cause the highlight to be presented with lesser prominence. Inverse relationships between scores and prominence of highlights may also be implemented if desired. As will be discussed below, highlights may assume various forms, including but not limited to visual forms (e.g., colors, lines, borders, fonts, icons, etc.), audio forms, and tactile forms. Prominence of the highlights may be adjusted by modifying the color or intensity of the highlight, or by modifying a width or format of a line or border, by changing fonts, by using different icons, by modifying aural attributes of an audio highlight, by modifying tactile attributes of a tactile highlight, etc. The presentation of highlighted content depends on the output device used to communicate the content to the user (e.g., a visual presentation of textual or graphical content or images, an aural presentation of audio content, a tactile presentation of content on a tactile device, etc.). Highlights thus provide a cue as to an importance or other significance imparted by a user to a portion of content that, when presented, draws the user's attention to the portion of the content.

In one aspect, a score may be mathematically calculated using numerical values either assigned to or derived from the highlight information received from users. In one simple implementation, each portion of a content (whether it be one or more letters, numbers, or non-alphanumeric objects, depending on the level of granularity and the type of content that can be identified) may have a score assigned thereto. Initially, the score for all of the content may be zero. Thereafter, the score for a particular portion of content may be incremented each time highlight information is received from a user and the highlight information identifies the particular portion of the content. If, for example, scores are maintained for each word in a text content, then each time a user selects a word to be highlighted, the score for the word is incremented. If the user highlights a sentence, the score for each of the words in the sentence is incremented. If the user highlights a letter in a word, the score for the word may or may not be incremented, depending on the particular implementation. As can be appreciated from the foregoing, as more users highlight the same content and the highlight information is aggregated, the score(s) associated with the content increase and the highlight of the content is strengthened, thus resulting in a more prominent highlight when the highlighted content is presented to users. Content that has not been highlighted or highlighted by only a few users may have no highlight or a highlight of low prominence when the content is presented. For example, an embodiment may require highlighting by a certain number of users or certain percentage of users in a group before an aggregated highlight of the content (even of low prominence) is presented to a user.

Figure 2B:
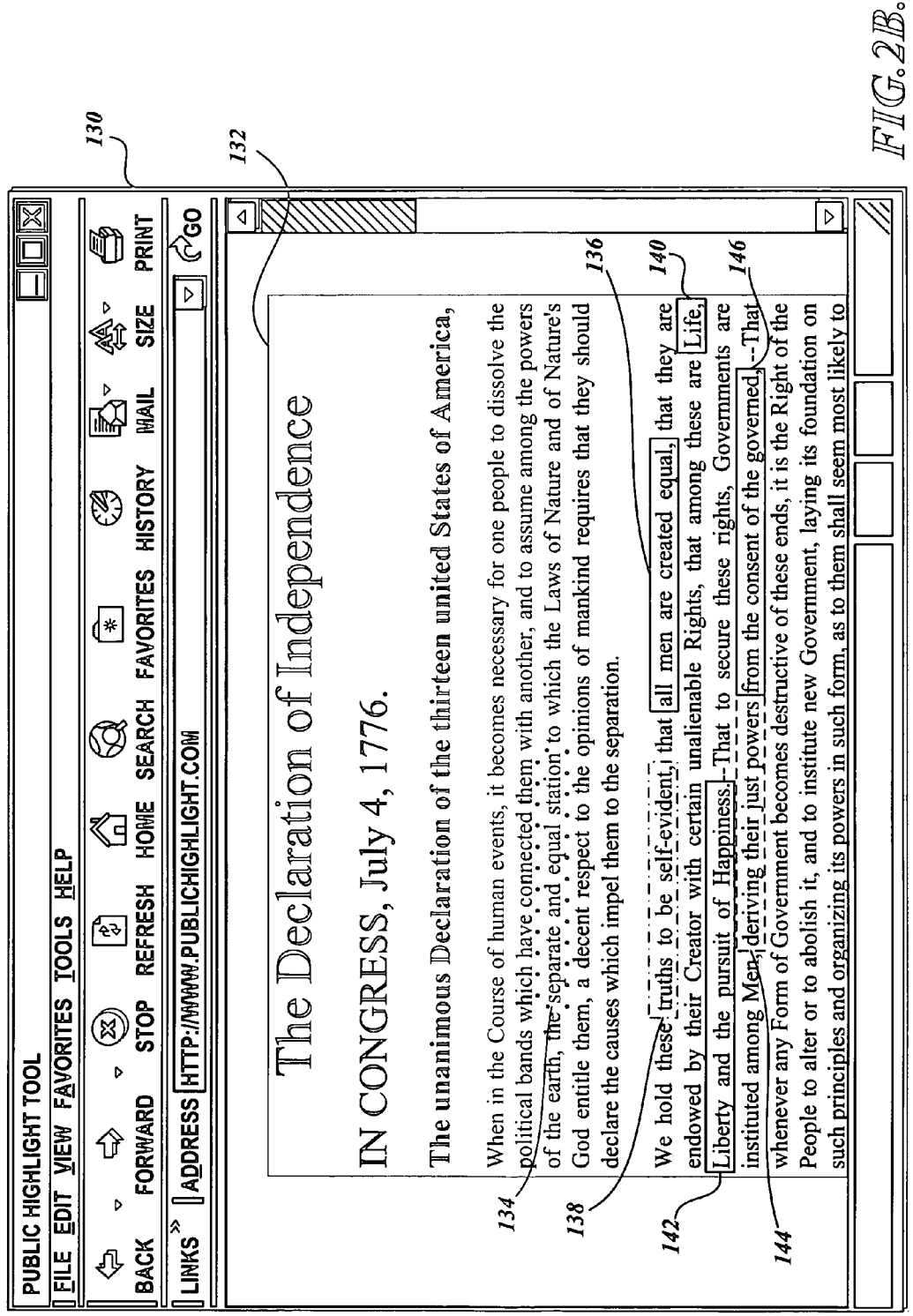
FIG. 2B is a display diagram of a typical Web browser as shown in FIG. 2A, wherein the content is displayed with highlights at varying levels of prominence based on aggregated highlight information received from a plurality of users.

FIG. 2B is a display diagram of a typical Web browser 130, e.g., as shown in FIG. 2A, wherein the content 132 is displayed with highlights at varying levels of prominence based on aggregated highlight information received from a plurality of users. In this example, the highlight indicated at reference numeral 134 is represented by a dotted line to indicate a highlight of lowest strength and thus a lowest level of prominence. The low strength of the highlight 134 may be the result of only a few users or one user who has highlighted the particular content.

A highlight of greatest prominence is shown at reference numeral 136. In this example, the highlight 136 is represented by a solid line to indicate a highlight of greatest strength and thus a highest level of prominence. The high strength of the highlight 136 may be the result of many users who highlighted the particular content. Highlights 140, 142, and 146 are also represented by a solid line to indicate a highlight of greatest strength. Depending on the implementation, the highlights 140 and 142 may be considered a single highlight that wraps with the content it is highlighting.

Highlights of medium strength are shown in FIG. 2B at reference numerals 138 and 144. The highlight 138 is shown represented by a dot-dashed line, thus indicating a highlight of low medium strength. The highlight 144 is shown represented by a dashed line, thus indicating a highlight of high medium strength. Due to the relative strengths of the highlights 138 and 144, the highlight 144 is presented with a prominence that is greater than the highlight 138 (but less than the prominence of the highlights 136, 140, 142 and 146).

Suppose, for purposes of discussion, a score is maintained for each word in the content 132 and multiple users identified the text "deriving their just powers from the consent of the governed" for highlighting. Suppose also that a different set of users highlighted just the text "from the consent of the governed." For the first set of users, the scores associated with all of the words in the phrase are incremented. For the latter set of users, the scores associated with each of the words "from the consent of the governed" are further incremented. Accordingly, the latter portion of the phrase will have higher scores than the earlier portion of the phrase. This circumstance is illustrated in FIG. 2B wherein the earlier portion of the phrase is highlighted with a less prominent highlight 144 and the latter portion of the phrase is highlighted with a more prominent highlight 146. When highlights are aggregated across multiple users in this manner, it becomes apparent that while the entire phrase was considered worthy of highlighting, the latter portion of the phrase merited a highlight of greater prominence, thus drawing greater attention by later readers of the highlighted content.

In some aspects, the aggregation of highlight information from multiple users may be referred to as "public highlighting." The public at large is able to contribute to the aggregated highlighting and benefit from viewing the aggregated highlighting. In implementations where a user's highlight information is stored with an identify of the user as well as aggregated with the highlight information of other users, a user may choose to view the content with just his or her own highlights or with the aggregated highlight information (or no highlights at all). An ability to choose whether to view the content with highlights, and if so, to view the content with personal or aggregated highlighting information, provides the user with greater flexibility when viewing the presentation of the content.

In some embodiments, controls may be instituted to manage the highlight information received from multiple users. It is possible that content may be "over-highlighted" in which too many portions of the content have been highlighted by users, which may diminish the value of the highlighting if most or all of the portions of content are highlighted. In one embodiment, a control may be implemented by simply taking into account the amount of highlighting received from any particular user or group of users. If a user or group of users is determined to be identifying too much of the content for highlighting, the user's highlight information may be given a lesser weight when the highlight information of the user is aggregated with the highlight information of other users. In some cases, a user's highlight information may be given no weight at all, thus effectively precluding the user's highlight information from affecting the aggregated highlight information. Highlight information having a lesser weight will have a lesser ability to affect the prominence at which the highlight is presented. In an implementation using mathematically calculated scores as discussed above, rather than incrementing the score(s) associated with the highlighted content by a full amount, the score(s) may be incremented by only a partial amount or no amount at all.

A process in which user highlight information is weighted to have a greater or lesser effect on prominence data is useful in other circumstances as well. For example, an embodiment may weight the highlight information received from a user based on a recognized reputation of the user. If the user is a known authority on the subject matter of the content, for example if the user is an author of the content, highlight information received from the user may be weighted to have a greater effect on the prominence data. Additionally or alternatively, a recognized reputation of a user may derive from feedback about the user received from other users. One example is an embodiment that allows users to vote on the usefulness of highlight information attributable to a particular user. Through a process of community feedback, the reputation of a user may improve and thus entitle the highlight information of the user to have greater weight when the highlight information of the user is aggregated with the highlight information of other users.

Another control for managing the highlight information received from users is one in which the prominence of highlights decays. For example, in an implementation using scores to determine prominence, the scores associated with highlighted content may decay over time. If a portion of text once highlighted has not been highlighted by other users over a period of time, the prominence of the highlight may diminish, perhaps to a minimum prominence or no highlight at all. The scores may decay according to any desired function, including but not limited to exponential, logarithmic, and linear functions. In some cases, the score may be configured to decay at a rate that varies according to a recognized reputation of the user(s) who supplied the highlight information. Alternatively, in cases where users who supplied highlight information belong to a group, the rate of decay may be configured to vary according to a recognized reputation of the group of users.

In another implementation, the scores associated with highlighted data may decay based on user activity with the content without further highlighting of the content. If, for example, a portion of text once highlighted has not been highlighted by other users despite further user activity with the content (e.g., accessing, storing, viewing, highlighting, etc., the content), the scores associated with the highlighted content may decay, leading to a diminished prominence of the highlight when the highlighted content is presented. User activity may also include a reaffirming of the highlight by a user. A user may reaffirm a highlight by commenting on, clicking on, or otherwise indicating a particular highlight through user input. Again, the prominence of the highlight may diminish to a minimum prominence or to no highlight at all. If there has been little or no user activity with the content, the prominence of the highlighted portions of the content may not decay.

As noted earlier, highlights may take on a variety of forms. For example, highlights may assume, without limitation, forms such as colors, lines, borders, fonts, icons, and even audio forms. The prominence at which the highlights may be presented can be adjusted by modifying attributes such as the color or intensity of the highlight, by modifying a width or format of a line or border, by changing fonts, by using different icons, by modifying aural attributes of an audio highlight, etc.

For instance, in one embodiment, prominence data associated with content to be highlighted defines a color of the highlight. A hierarchy of colors may be set up such that, depending on the strength of the highlight (e.g., a higher score indicating a greater strength), different colors may be selected and used when presenting the highlighted content. Colors considered more prominent (e.g., yellow or red) may be selected for highlights of greater strength, and colors considered less prominent (e.g., blue or green) may be selected for highlights of lesser strength. In this manner, the color is selected to indicate the strength of the highlight. In an implementation where mathematical calculations determine the prominence of a highlight, thresholding may be used to select the color of the highlight. Scores above a certain value may entitle the highlight to be presented in red, while scores in other ranges may entitle the highlight to be presented in yellow, blue or green (or any other color), for example. Alternatively, the value of scores may be tied to numerical values of hues, for example, wherein a score directly indicates a color hue.

In another embodiment where color highlights are used, the strength of a highlight may be adjusted by modifying an intensity of the color of the highlight. In this regard, the intensity of a color may encompass brightness and/or saturation of the color. Highlights of greater strength are thus presented with a greater intensity that enhances the prominence of the highlights. Highlights of lesser strength are presented with a lesser intensity that diminishes the prominence of the highlights.

In another embodiment, the prominence data associated with highlighted content may define a border that surrounds the highlighted content. For example, where the border is comprised of a line, the prominence data may appear to define a box around the highlighted content. To adjust the prominence at which the highlight is presented, the line width of the border may be modified, thus indicating the strength of the highlight. A thicker line width may be considered more prominent and used with highlights of greater strength. A thinner line may be considered less prominent and used with highlights of lesser strength.

In another embodiment where border highlights are used, the border may be comprised of a line having a line format that is selected to indicate the strength of the highlight. For instance, as shown in FIG. 2B, the highlight 134 is depicted having a dotted line format, the highlight 138 is depicted having a dot-dashed line format, the highlight 144 is depicted having a dashed line format, and the highlights 136, 140, 142, and 146 are depicted having a solid line format. These line formats and other line formats may be selected and used for highlighting content based on a perceived level of prominence of the line formats. In some embodiments, borders may be computer generated based on user input. In other embodiments, borders may be generated from user handwriting, e.g., a user circling text using a tablet computer.

In yet another embodiment, prominence data associated with highlighted content, typically textual content, may define a font for the highlighted content when the content is displayed. In that regard, the font may be selected to indicate the strength of the highlight. For example, content may be presented in a bolded or italicized font, e.g., as shown in FIG. 2C at reference numeral 156, to indicate different levels of prominence. Content may be bolded and italicized, e.g., as shown at reference numeral 160 in FIG. 2C, to illustrate even greater prominence, and thus strength, of the highlight of the content.

In a further embodiment, prominence data associated with highlighted content may define an underline for the highlighted content. The format of the underline may be selected to indicate the strength of the highlight. For example, content may be highlighted by a single underline, e.g., as shown at reference numeral 150 in FIG. 2C. Content having a highlight of greater strength may be presented with a double underline, e.g., as shown at reference numerals 152 and 154 in FIG. 2C. Triple and quadruple (or more) underlines may be used for greater prominence, if desired.

In a further embodiment, prominence data associated with highlighted content may define an icon for presentation with the highlighted content. The icon may be selected to indicate the strength of the highlight. An icon may embody any shape or form, such as a symbol or alphanumeric character(s). In FIG. 2C, for example, a highlight in the form of a star is shown at reference numeral 162. The icon may also be selected to have a particular size, line width, or other attribute, to produce a highlight of greater or lesser prominence. As illustrated in FIG. 2C, the icon 162 may be placed in proximity to the content it is highlighting when the highlighted content is presented. Informational aspects of the icon may also provide an indication of prominence. For example, if a numeric character is used as an icon, or if a numeric character is included with another icon, such as inside the star shown in FIG. 2C, the numeric character may have a perceived value, wherein a greater value (e.g., a higher number) indicates a greater prominence.

In still a further embodiment, a highlight of content may be an audio highlight. In that case, prominence data associated with the highlighted content may define an aural attribute of the highlight. A wide variety of aural attributes, such as loudness, pitch, duration, combination of tones, rhythms, etc., may be modified to produce a highlight of greater or lesser prominence. In one implementation, an audio highlight may be presented to a user (e.g., through playback of the audio) when a user positions a pointer in proximity to the highlighted content for a predetermined period of time. In this implementation or in others, an aural attribute such as volume may vary as a function of the distance between a pointer and the highlighted text. For example, as a user operates a mouse to move a pointer closer to the highlighted content, the volume of the audio highlight gets louder. A visual indicator of the audio highlight may or may not be present to visually identify the audio highlighted content. In yet further embodiments providing tactile user interaction (e.g., for the visually impaired), content may be provided to a user in which a variable attribute of a tactile feature (such as temperature, sharpness, vibration, etc.) indicates highlighted content at varying prominence.

It should also be appreciated that the highlight may not appear in the content itself. For example, an embodiment may present highlighted content in a list separate from the content in which the highlighted content is found. The highlighted content in the list may be ranked by the strength of the highlight so that the most prominent highlighted content is indicated first, followed by highlighted content of lesser prominence. In this manner, a user may be able to quickly observe the portions of the content that users collectively have considered to be most important. If appropriate, some content around the highlighted content may be provided in the list to provide context to the highlighted content. Alternatively, the highlighted content in the list may be accompanied by an indication of the location in the content where the highlighted content appears.

As can be appreciated from the foregoing, various forms of highlights and prominence data for presenting the highlights may be used when presenting content that has been highlighted by a plurality of users. Notable is the fact that when different users highlight the same content, the prominence of the highlight may be adjusted to reflect the combined highlight information of the different users. In yet other embodiments, a user may be given opportunity to indicate a level of importance of the highlighted content, in additional to identifying the content to be highlighted. Where the highlight information received from a user includes a user-indicated level of importance of the highlighted content, the level of importance may be taken into account when the prominence data for the highlighted content is modified.

For example, a user may be given a palette of colors to use when inputting personal highlights of the content. Certain colors may be designated to identify content that the user considers more important (or valuable or relevant, etc., all of which is included in the term "importance" of the identified content). The user may select one or more colors for highlighting content of greater importance, and one or more different colors for highlighting content of lesser importance. Depending on the user's choice of color when highlighting the content, different weights may be included in the user's highlight information that affects the influence of the user's highlight information when the highlight information is aggregated with highlight information of other users.

In another example, a user may be given a button or control for user input, such as a field for numerical entry, that the user can use to indicate a level of importance of a highlight. Again, as the user input is received and/or control is activated while the user is identifying content for highlighting, the information input by the user may be interpreted as indicating the importance of the highlight, causing different weights to be included in the user's highlight information. Highlights indicated of greater importance by a user may be weighted to have a greater effect on the aggregated highlight information than highlights indicated as having lesser importance.

Although public highlighting as described herein for some embodiments may include highlight information received from all users having access to the content highlighting service 106 shown in FIG. 1, in other embodiments the public highlighting may be limited to users that belong to a group. In such embodiments, the highlight information of the user is aggregated only with highlight information of the other users who belong to the group. A group of users may choose to collaborate by aggregating highlights input by the members of the group. For example, without limitation, a group may be comprised of family members or persons living in the same apartment or in the same fraternity, persons in a class (e.g., a study group), members of a club or other affiliation, etc. Each person in the group may input their personal highlights and allow the highlight information of all the users in the group to be aggregated using the public highlight techniques discussed herein. Multiple groups may each have separately aggregated highlight information for the same content and the aggregated highlight information for each group is presented separately.

Figure 3:
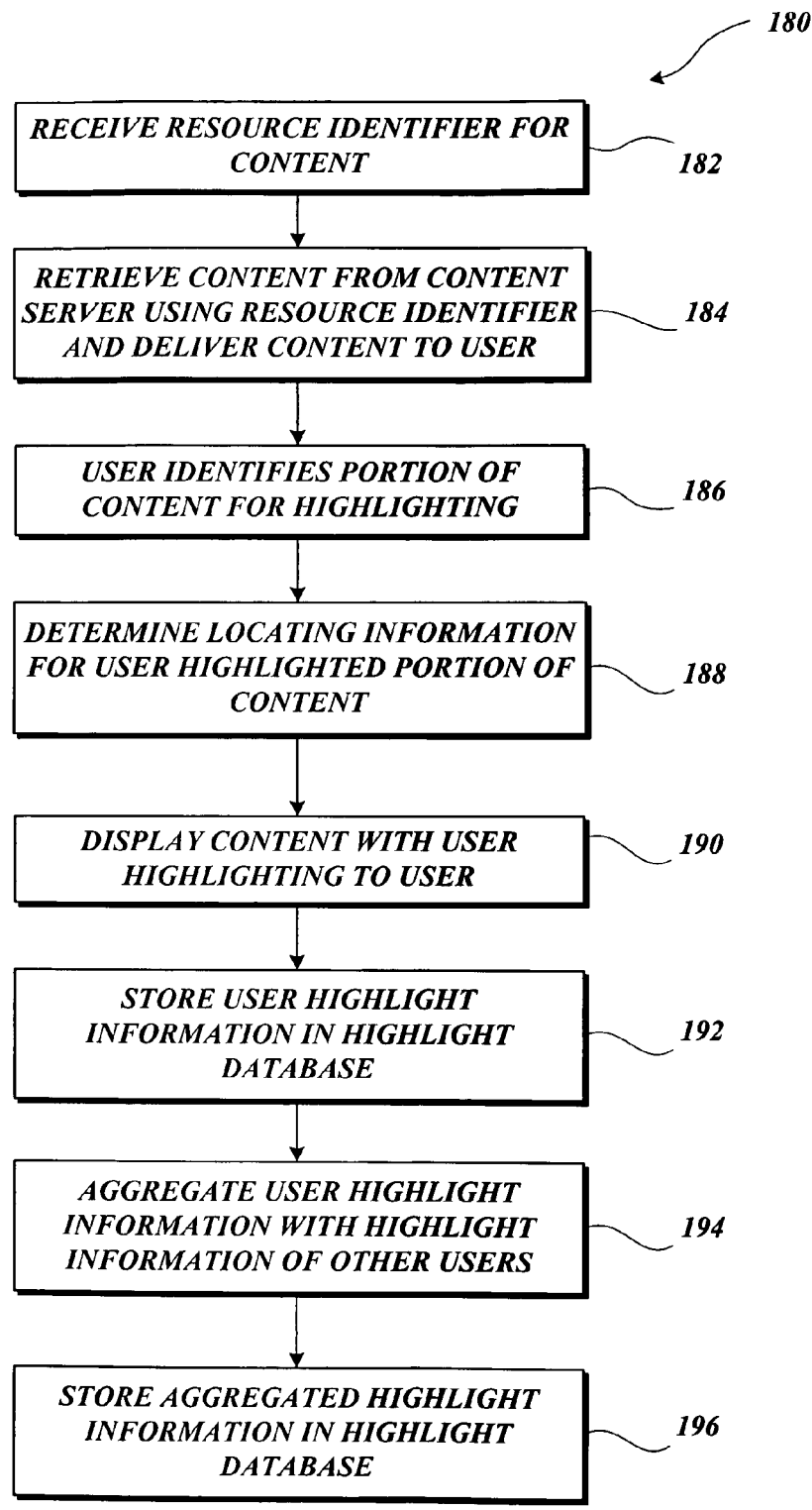
FIG. 3 is a flow diagram of one exemplary method for receiving and aggregating highlight information from a user with highlight information of other users.

Turning now to FIG. 3, a flow diagram is shown describing one exemplary method 180 for receiving and aggregating highlight information from a user with highlight information of other users. In a first block 182, a resource identifier is received from a user at a client device desiring to access content. For example, a user may enter a URL in a Web browser. At a second block 184, content identified by the resource identifier is retrieved, such as from a content server, and delivered to the requesting client device. Thereafter at block 186, the user considers the content and identifies portions of the content to be highlighted using one or more highlight tools as discussed above (e.g., by dragging a pointer over particular content presented on a display).

At block 188, locating information for the user highlighted portions of the content is determined. For example, horizontal and vertical position information comprising X and Y position information may be determined to identify a location of the content to be highlighted. Width and height information may also be determined to determine a size of the particular content. This information may be recorded in the form of quads, as discussed earlier. Alternatively, locating information may be determined to identify the location of highlighted content relative to a display of the content, or relative to positions of points or markers in the content.

Once locating information for a highlight is determined, the content may be presented to the user at block 190 with the user's personal highlighting added in accordance with the locating information. This gives the user the satisfaction of a response that acknowledges receipt of the user's highlight information. Presentation of the content with the user's personal highlighting is not required, however.

The user's highlight information, which may include the locating information determined at block 188, may be stored in the highlight database 104, as indicated at block 192. The highlight information may be stored with or without associating the user's identity with the highlight information. Storage of the user's highlight information at block 192 is optional.

At block 194, the highlight information of the user is aggregated with the highlight information received from other users for the same content. As discussed above, various algorithms can be used to aggregate the highlight information of users and, depending on the particular implementation, produce one or more scores that represent a combination of the highlight information. One simple algorithm is configured to increment a score associated with a portion of content that a user has highlighted. As other users highlight the same portion of content, the score associated with the portion of content is incremented. The locating information obtained when receiving user highlight information indicates the content that the users have highlighted. Other algorithms may introduce various weights that, in one implementation, mathematically increase or decrease the effect of the user's highlight information on the calculation of the scores. Such aggregated highlight information, including scores, may be stored in the highlight database 104 for later retrieval, as indicated at block 196.

It should be understood that the process of communicating a user's highlight information to the highlight server 102 (e.g., as indicated at block 186) can occur on a real-time, periodic or aperiodic basis. Similarly, at block 194, once a user's highlight information is received at the highlight server 102, the aggregation of the user's highlight information with the highlight information of others (including modifying the aggregated highlight information in the highlight database 104 to take into account the newly-received user highlight information) may occur on a real-time, periodic or aperiodic basis.

Aggregated highlight information that is stored in the highlight database 104 is used to present highlighted content to users, which highlighted content takes into account a combination of personal highlights input by a plurality of users. To accomplish this objective, the aggregated highlight information in one embodiment includes an identification of the content to be highlighted (e.g., a resource identifier) and locating information that indicates the particular portions of the content to be highlighted. Also included with the aggregated highlight information is prominence data that affects the prominence of each of the highlights when the highlighted content is presented to a user. As discussed herein, prominence data may include the form(s) of highlight to be used with the content and/or one or more scores. This information may be stored in the highlight database 104 in any desired format, such as but not limited to, a searchable relational database. Typically, the database 104 will be searchable according to at least the identification of the content. Thus given the identification of the content, the highlight server 102 can retrieve the locating information, the form(s) of highlight, and the prominence scores associated therewith, which information can be modified and stored again as appropriate, or used to present the content with aggregated highlights of varying prominence to a user.

When a user requests to view content in connection with aggregated highlight information, different embodiments may handle the user request in different ways. In one embodiment, a user may submit a resource identifier for the content using a content viewer (e.g., Web browser or other viewer or reader) running locally to the user, e.g., on one or more of the client devices 110, 112, 114 (FIG. 1). The content viewer may in turn submit the resource identifier to the highlight server 102, which thereafter manages the retrieval of the content, such as by communicating with a content server 122. The highlight server 102 also obtains aggregated highlight information stored in the highlight database 104 in association with the requested content. Once the content and the aggregated highlight information are obtained, the highlight server 102 may modify the content by adding highlights to the content in accordance with the aggregated highlight data. The content with highlights is then delivered to the requesting client device for presentation to the user.

Alternatively, rather than modifying the content to include highlights at the highlight server 102 prior to delivering the highlighted content to the user, the highlight server 102 may immediately deliver the retrieved content without highlights to the requesting client device. In the meantime, the highlight server 102 obtains the relevant aggregated highlight information from the highlight database 104 and delivers the highlight information to the client device. The content viewer or other application running locally on the user's client device may process the highlight information to add appropriate highlights to the content prior to presenting the highlighted content to the user.

In yet another embodiment, a user's client device may directly obtain the content from the content server 122 without requiring the highlight server 102 to manage the content retrieval. To obtain the aggregated highlight information for the content, the user's client device may communicate the resource identifier for the content to the highlight server 102 which uses the resource identifier to obtain the pertinent aggregated highlight information from the highlight database 104.

In still another embodiment, aggregated highlight information may be stored in the content itself and retrieved when the content is retrieved. One example of this is a document that has highlight information embedded therein, wherein the highlights are configured to appear at varying prominence depending on aggregated highlight information embedded in the document. Alternatively, aggregated highlight information may be appended to the content or stored in a file separate from the content but closely identified with the content, e.g., by a link or pointer.

As discussed earlier, in one embodiment, content may be highlighted by positioning one or more blocks of transparent color to overlay the content to be highlighted, thus creating the effect of a colored highlight when the highlighted content is presented. In one exemplary implementation, the client device may use DHTML layering or Java script technology to cause the client device to present the highlight with the content. Other applications, including but not limited to word processor applications, are also able to present content with highlights. By having the client device process the highlight information and add the highlight to the content, the amount of information to be communicated from the highlight server 102 to the client device (as to highlighting) may be limited. For instance, as discussed earlier, highlight information may include numeric "quads" that identify the location of the content to be highlighted. A quad is a set of four numbers that describes the X and Y position and possibly also width and height of the content to be highlighted. In another embodiment, only the X and Y position of highlighted content may be communicated and a highlight of a predetermined size is positioned over the content. Minimizing the amount of information that the highlight server 102 needs to communicate to the client devices 110, 112, 114 may reduce the amount of time and bandwidth that it takes to communicate between the highlight server 102 and the client devices 110, 112, 114.

Figure 4:
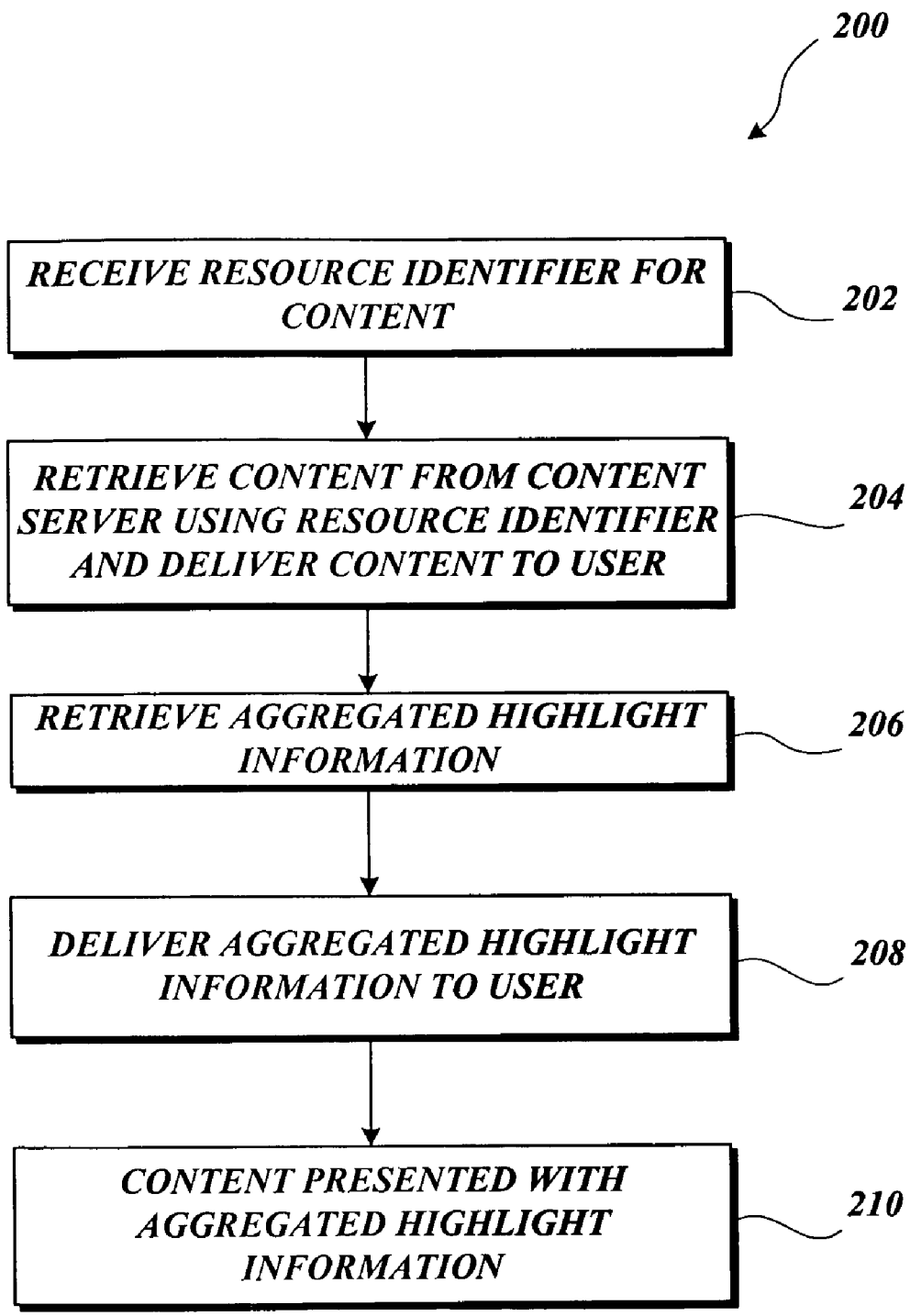
FIG. 4 is a flow diagram of one exemplary method for presenting content with highlights in accordance with highlight information that is aggregated from a plurality of users.

FIG. 4 depicts a flow diagram of one exemplary method 200 for presenting content with highlights in accordance with highlight information that is aggregated from a plurality of users. At a first block 202, a resource identifier for content is received, e.g., by the highlight server 102 shown in FIG. 1. In response, the highlight server 102 may proceed to retrieve the original unhighlighted content identified by the resource identifier from the content server 122 and deliver the content to the user, as indicated at block 204, though this is optional. In a different implementation, the user may retrieve the content directly from the content server 122. In either case, the highlight server 102 uses the resource identifier to retrieve aggregated highlight information pertaining to the content from the highlight database 104, as indicated at block 206. As discussed herein, the aggregated highlight information includes prominence data, such as one or more scores, that affect the prominence at which highlights are displayed when the highlighted content is presented to the user. The aggregated highlight information is delivered to the user, as indicated at block 206. The aggregated highlight information may be delivered directly to the user, wherein the user's computing system adds highlights to the content in accordance with the aggregated highlight information and presents the highlighted content to the user. Alternatively, the aggregated highlight information is delivered to the user in the form the content modified at the highlight server 102 in accordance with the aggregated highlight information, which highlighted content is delivered to the user. Finally, at block 210, the user is presented with the content having public highlights displayed therewith in accordance with the aggregated highlight information.

While various illustrative embodiments have been described herein, it will be appreciated that various changes can be made therein without departing from the spirit and scope of the invention. For example, a user may access a file that includes the content and locally highlight one or more portions of the content. To obtain the benefit of public highlighting, as discussed herein, the user may submit the file with the locally highlighted content to a highlighting service, e.g., the highlighting service 106 in FIG. 1. After identifying the content (either by receiving explicit information from the user, such as a resource identifier for the content, or by comparing the received content to content of known origin), the highlighting service 106 may extract the highlight information from the content and aggregate it with highlight information received from other users for the same content. Alternatively, or in addition, the highlighting service 106 may access the aggregated highlight information for the content and return the content highlighted with the aggregated highlight information. The highlight service may also return just the aggregated highlight information, thus allowing the user's local device to apply the aggregated highlight information to the content for presentation of the "public highlights" to the user.

In still another example, a "smart" highlighting feature may be implemented in which user highlighting of one portion of content may automatically result in application of similar highlighting to other portions of content. The other portions of content that are automatically highlighted may be related to the user highlighted portion, e.g., by an explicit relationship or by an inferred relationship. For example, a user highlighting a word in an index may cause that word to be highlighted throughout the content as indicated in the index. Similarly, a user highlight of a header in a table of contents may cause the corresponding section of the content to be highlighted. Yet other embodiments may recognize a user highlighted portion of content, such as a phrase, and automatically highlight the same phrase when the phrase appears elsewhere in the content. Of course, these examples are illustrative only and do not limit the invention.

The scope of the invention should be determined from the following claims and equivalents thereto.

The embodiments of the invention in which an exclusive property or privledge is claimed are defined as follows:

1. A system for presenting highlighted content, comprising:
   a storage component configured to store prominence data in association with content, wherein the content comprises a plurality of words, wherein the prominence data includes a score for each word of the content, and wherein the score is set to a predetermined value for each word of the content for which highlight information identifying a portion of the content containing the word has not been received;
   a computing component configured to receive highlight information from a user, wherein the highlight information identifies a portion of the content to which a highlight is to be applied;
   a reputation component configured to receive feedback from other users comprising indications of usefulness of highlight information received from the user, and to derive a recognized reputation of the user based on the feedback; and
   a processing component configured to aggregate the highlight information of the user with highlight information received from other users for the same content by modifying the score by an increment for at least one word of the plurality of words for each instance in which highlight information identifying a portion of the content containing the at least one word is received, wherein a size of the increment is determined based on the recognized reputation of the user as derived from the received feedback;

wherein the storage component is further configured to store the aggregated highlight information, and wherein the prominence data is configured to affect a prominence of the highlight when the highlighted content is presented.

2. The system of claim 1, wherein the highlight information includes locating information that identifies a location of the highlighted content.

3. The system of claim 1, wherein the score indicates a strength of the highlight for the highlighted content.

4. The system of claim 3, wherein a score indicating greater strength causes the highlight to be presented with greater prominence when the highlighted content is presented.

5. The system of claim 3, wherein the highlight is a visual highlight and the prominence data defines a visual attribute to indicate the strength of the highlight.

6. The system of claim 3, wherein the highlight is an audio highlight and the prominence data defines an aural attribute to indicate the strength of the highlight.

7. The system of claim 3, wherein the highlight is a tactile highlight and the prominence data defines a tactile attribute to indicate the strength of the highlight.

8. The system of claim 1, wherein the score is configured to decay over time.

9. The system of claim 1, wherein the score is configured to decay based on user activity with the content without further highlighting of the content.

10. The system of claim 1, wherein the highlight information of the user is weighted to have a greater or lesser effect on the prominence of the highlight than the highlight information of other users.

11. The system of claim 1, wherein the user and other users belong to a group and wherein the processing component is configured to aggregate the user's highlight information only with highlight information of the other users who belong to the group.

12. The system of claim 1, wherein the highlight information includes a user-indicated level of importance of the highlighted content, and wherein the processing component is configured to modify the prominence data in accordance with the user-indicated level of importance.

13. The system of claim 1, wherein the computing component is configured to receive the highlight information from the user on a real-time basis.

14. The system of claim 1, wherein the computing component is configured to receive the highlight information from the user on a periodic basis.

15. The system of claim 1, wherein the computing component is configured to receive the highlight information from the user on an aperiodic basis.

16. A computer-implemented method for highlighting content, the method comprising:

under control of instructions stored on a computer-readable medium and executed by at least one processor of a computer system:

storing a score for each word of a content, wherein the content comprises a plurality of words, and wherein the score for each word of the content initially is set to a predetermined value;

receiving highlight information from a user, wherein the highlight information identifies one or more units of text to be highlighted, wherein the units of text include one or more words;

receiving feedback from other users comprising indications of usefulness of other highlight information received from the user;

deriving a recognized reputation of the user from the received feedback; and aggregating the highlight information of the user with highlight information received from other users for the same content by modifying the score stored for a word identified by the received highlight information for each instance in which highlight information identifying the one or more units of text containing the word is received, wherein the score is modified by an amount determined based on the recognized reputation of the user derived from the received feedback, and wherein the score is included in prominence data configured to affect a prominence of the highlight when the highlighted content is displayed.

17. The computer-implemented method of claim 16, wherein the highlight information includes locating information that identifies a location of the highlighted content.

18. The computer-implemented method of claim 17, wherein the locating information includes horizontal and vertical position information that identifies the location of the highlighted content.

19. The computer-implemented method of claim 17, wherein the locating information further includes size information that identifies a size of the highlighted content.

20. The computer-implemented method of claim 19, wherein the size information includes width and height information of the highlighted content.

21. The computer-implemented method of claim 16, wherein the score indicates a strength of the highlight for the highlighted content.

22. The computer-implemented method of claim 21, wherein a score indicating greater strength causes the highlight to be presented with greater prominence when the highlighted content is presented.

23. The computer-implemented method of claim 21, wherein the highlighted content is presented in context with the content in which the highlighted content is found.

24. The computer-implemented method of claim 21, wherein highlighted content is presented separately from the content in which the highlighted content is found.

25. The computer-implemented method of claim 24, wherein the highlighted content is presented according to the strength of the highlight.

26. The computer-implemented method of claim 21, wherein the score is determined from a calculation that combines the highlight information of the user and the other users.

27. The computer-implemented method of claim 21, wherein the highlight is a visual highlight and the prominence data defines a visual attribute indicative of the strength of the highlight.

28. The computer-implemented method of claim 27, wherein the visual attribute is color.

29. The computer-implemented method of claim 28, wherein an intensity of the color is modified to indicate the strength of the highlight.

30. The computer-implemented method of claim 28, wherein the color is selected to indicate the strength of the highlight.

31. The computer-implemented method of claim 27, wherein the visual attribute is a border that surrounds the highlighted content.

32. The computer-implemented method of claim 31, wherein the border is comprised of a line having a line width that is modified to indicate the strength of the highlight.

33. The computer-implemented method of claim 31, wherein the border is comprised of a line having a line format selected to indicate the strength of the highlight.

34. The computer-implemented method of claim 31, wherein the border is a handwritten border.

35. The computer-implemented method of claim 27, wherein the visual attribute is a typeface for the highlighted content, and wherein the typeface is selected to indicate the strength of the highlight.

36. The computer-implemented method of claim 27, wherein the visual attribute is an underline for the highlighted content, and wherein a format of the underline is selected to indicate the strength of the highlight.

37. The computer-implemented method of claim 27, wherein the visual attribute is an icon for presentation with the highlighted content, the icon being selected to indicate the strength of the highlight.

38. The computer-implemented method of claim 21, wherein the highlight is an audio highlight and the prominence data defines an aural attribute to indicate the strength of the highlight.

39. The computer-implemented method of claim 38, wherein the audio highlight is presented when a user positions a pointer in proximity to the highlighted content for a predetermined period of time.

40. The computer-implemented method of claim 39, wherein an aural attribute of the highlight changes as a function of a distance between the pointer and the highlighted content.

41. The computer-implemented method of claim 21, wherein the highlight is a tactile highlight and the prominence data defines a tactile attribute to indicate the strength of the highlight.

42. The computer-implemented method of claim 16, wherein the highlight information of the user is weighted to have a greater or lesser effect on the prominence of the highlight than the highlight information of other users.

43. The computer-implemented method of claim 42, wherein the highlight information of the user is weighted to have a greater effect on the prominence of the highlight if the user is an author of the content to be highlighted.

44. The computer-implemented method of claim 42, wherein the user and other users belong to a group and wherein the highlight information of the users in the group is weighted to have a greater or lesser effect on the prominence of the highlight based on a recognized reputation of the group of users.

45. The computer-implemented method of claim 16, further comprising configuring the score to decay over time.

46. The computer-implemented method of claim 45, wherein the score is configured to decay at a rate that varies according to a recognized reputation of the user who supplied the highlight information.

47. The computer-implemented method of claim 45, wherein users who supplied the highlight information belong to a group and wherein the score is configured to decay at a rate that varies according to a recognized reputation of the group of users.

48. The computer-implemented method of claim 16, further comprising configuring the score to decay based on user activity with the content without further highlighting of the content.

49. The computer-implemented method of claim 48, wherein the user activity includes a reaffirming of the highlight by a user.

50. The computer-implemented method of claim 16, wherein the user and other users belong to a group and the user's highlight information for the content is aggregated only with highlight information of the other users who belong to the group.

51. The computer-implemented method of claim 16, wherein the highlight information includes a user-indicated level of importance of the highlighted content, which level of importance affects the prominence data when the prominence data for the highlighted content is modified.

52. The computer-implemented method of claim 16, further comprising identifying additional content related to the content identified in the user's highlight information and automatically highlighting the additional content, wherein the highlight information that is aggregated includes highlight information for the additional content.

53. A computer-readable medium having computer-executable instructions stored thereon that, if executed, cause one or more computer processors to:
  store prominence data associated with content, wherein the content comprises a plurality of characters, wherein the prominence data includes at least one score for each character of the content, and wherein the at least one score for each character of the content initially is set to a predetermined value for each character of the content for which highlight information identifying the character has not been received;
  aggregate highlight information received from a plurality of users who have identified content to be highlighted, wherein the highlight information identifies at least one character of text of the content;
  store reputation data associated with each of the plurality of users, wherein the reputation data is derived from feedback received from the users indicating usefulness of highlight information received from identified users; and
  modify the at least one score associated with the at least one identified character of text, based on the received highlight information and the reputation data for each instance in which highlight information identifying the at least one identified character of text is received, to affect a prominence of the highlight when the highlighted content is presented to a user.

54. The computer-readable medium of claim 53, wherein the instructions, if executed, further cause the one or more computer processors to present the highlighted content in context with the content in which the highlighted content is found.

55. The computer-readable medium of claim 53, wherein the instructions, if executed, further cause the one or more computer processors to present the highlighted content separately from the content in which the highlighted content is found.

56. The computer-readable medium of claim 53, wherein the score indicates a strength of the highlight.

57. The computer-readable medium of claim 56, wherein a score indicating greater strength causes the one or more computer processors to present the highlight with greater prominence.

58. The computer-readable medium of claim 56, wherein the instructions, if executed, further cause the one or more computer processors to determine the score from a calculation that combines the highlight information of the plurality of users.

59. The computer-readable medium of claim 53, wherein the instructions, if executed, further cause the one or more computer processors to weight the highlight information of a user to have a greater or lesser effect on the prominence of the highlight than the highlight information of other users.

60. The computer-readable medium of claim 59, wherein the highlight information of the user is weighted to have a greater effect on the prominence of the highlight if the user is an author of the content to be highlighted.

61. The computer-readable medium of claim 56, wherein the instructions, if executed, further cause the one or more computer processors to make the score decay over time.

62. The computer-readable medium of claim 61, wherein the score decays at a rate that varies according to reputation data of the user who supplied the highlight information.

63. The computer-readable medium of claim 56, wherein the instructions, if executed, further cause the one or more computer processors to make the score decay based on user activity with the content without further highlighting of the content.

64. The computer-readable medium of claim 53, wherein the instructions, if executed, further cause the one or more computer processors to aggregate only the highlight information of users who belong to a group.

65. The computer-readable medium of claim 53, wherein the instructions, if executed, further cause the one or more computer processors to receive highlight information in a file from a user, wherein the file includes the content to which the highlight is to be applied.

66. A computer-implemented method for highlighting content, the method comprising:
    under the control of instructions executed by a computer system:
    storing scores associated with each of a plurality of segments of text content, wherein each score initially is set to a predetermined value;
    applying a highlight to a portion of content as an indication of interest by a user in said portion of content, the portion of content comprising one or more segments of text content;
    incrementing the score associated with each of the one or more segments of text content in said portion of content based on each indication of interest by the user in said portion of content and interest in said portion of content indicated by other users, wherein an amount by which the score is incremented is determined based on a percentage of a total amount of content in which the user has indicated interest, and wherein the amount by which the score is incremented is determined based on a recognized reputation derived from user feedback; and
    modifying a prominence of the highlight based on the score.

67. The computer-implemented method of claim 66, wherein the highlight is applied based on locating information received from the user that identifies a location of said portion of content.

68. The computer-implemented method of claim 66, wherein the score indicates a strength of the highlight.

69. The computer-implemented method of claim 68, wherein a score indicating greater strength causes the highlight to be presented with greater prominence when said portion of content is presented.

70. The computer-implemented method of claim 66, wherein the highlight is a visual highlight and the prominence of the highlight is modified by modifying a visual attribute of the highlight.

71. The computer-implemented method of claim 66, wherein the highlight is an audio highlight and the prominence of the highlight is modified by modifying an aural attribute of the highlight.

72. The computer-implemented method of claim 66, wherein the highlight is a tactile highlight and the prominence of the highlight is modified by modifying a tactile attribute of the highlight.

73. The computer-implemented method of claim 66, further comprising configuring the score to decay over time.

74. The computer-implemented method of claim 66, further comprising configuring the score to decay based on user activity with the content without further highlighting of the content.

75. The computer-implemented method of claim 74, wherein the user activity includes a reaffirming of the highlight by a user.

76. The computer-implemented method of claim 66, wherein the interest indicated by a user in said portion of content is weighted to have a greater or lesser effect on the prominence of the highlight than the interest indicated by other users.

77. The computer-implemented method of claim 66, wherein the indication of interest by the user in said portion of content includes a user-indicated level of importance of the highlighted content, the method further comprising modifying the prominence of the highlight in accordance with the user-indicated level of importance.

78. The system of claim 2, wherein, for content comprised of text, the locating information identifies one or more words in the text to which the highlight is to be applied.

79. The method of claim 52, wherein said automatically highlighting the additional content comprises highlighting a selected word throughout the content when the user's highlight information indicates a highlighting of the selected word in an index.

80. The method of claim 52, wherein said automatically highlighting the additional content comprises highlighting a section of content when the user's highlight information indicates a highlighting of a corresponding section header in a table of contents.

81. The method of claim 52, wherein said automatically highlighting the additional content comprises highlighting a selected phrase throughout the content when the user's highlight information indicates a highlighting of the selected phrase.

82. The system of claim 1, wherein the size of the increment is determined based on a percentage of a total amount of content identified in highlight information received from the user.

83. The method of claim 16, wherein the score is modified by an amount determined based on a total number of units of text identified in highlight information received from the user.

84. The computer-readable medium of claim 53, wherein the instructions, if executed, further cause the one or more computer processors to modify the at least one score associated with the at least one identified character of text based on a percentage of a total amount of content identified in highlight information from a user.

* * * * *